W. H. TRABUE.
OVERSHOE FOR HORSES.
APPLICATION FILED OCT. 1, 1910.
979,602.
Patented Dec. 27, 1910.
2 SHEETS—SHEET 1.
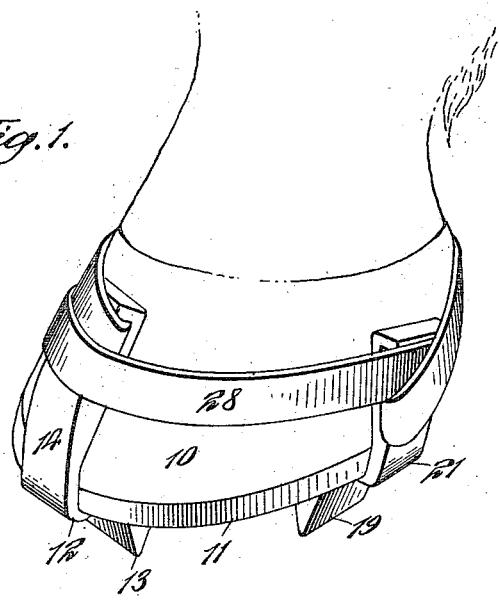
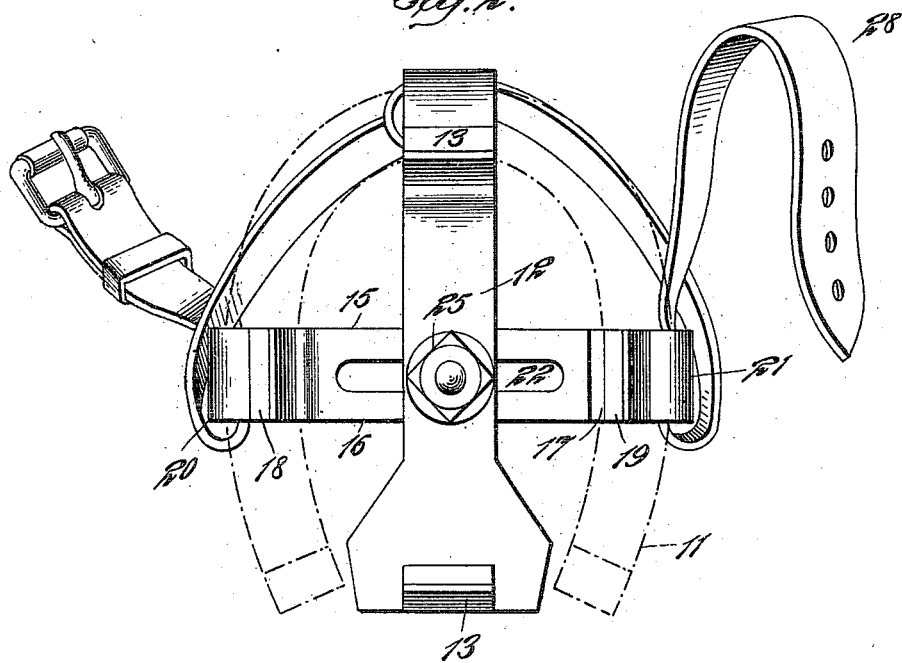

W. H. TRABUE.
OVERSHOE FOR HORSES.
APPLICATION FILED OCT. 1, 1910.
979,602.
Patented Dec. 27, 1910.
2 SHEETS—SHEET 2.
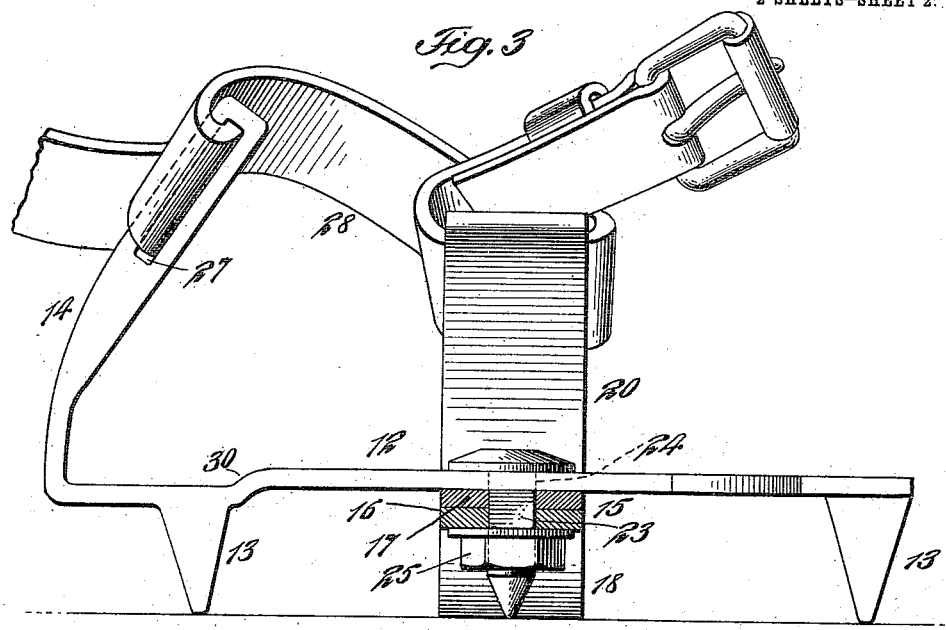
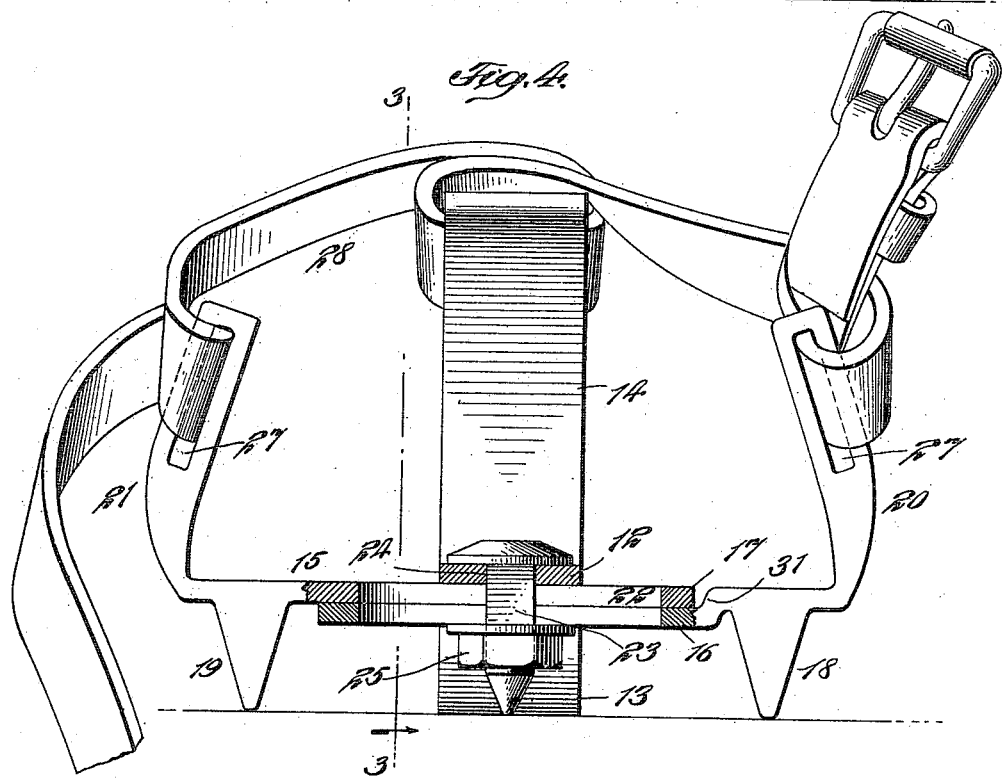

UNITED STATES PATENT OFFICE.

WILLIAM H. TRABUE, OF MONTVALE, NEW JERSEY.

OVERSHOE FOR HORSES.

979,602. Specification of Letters Patent. Patented Dec. 27, 1910.

Application filed October 1, 1910. Serial No. 584,798.

*To all whom it may concern:*

Be it known that I, WILLIAM H. TRABUE, a citizen of the United States, and a resident of Montvale, in the county of Bergen and State of New Jersey, have invented certain new and useful Improvements in Overshoes for Horses, of which the following is a specification.

The invention relates to improvements in overshoes for horses, and it consists in the novel attachment hereinafter described, and particularly pointed out in the claims, to be applied upon the hoof and ordinary shoe of a horse for preventing the horse from slipping on ice-covered streets or upon streets rendered unduly smooth by other causes.

The object of the invention is to provide an overshoe or attachment of highly efficient and simple and durable character capable of ready application to the hoof of a horse over the ordinary shoe nailed on said hoof.

A further object of the invention is to provide an overshoe capable of ready adjustment to hoofs varying in width.

The invention will be fully understood from the detailed description hereinafter presented, reference being had to the accompanying drawings, in which:

Figure 1 is a perspective view illustrating the overshoe or attachment as applied to the hoof of a horse; Fig. 2 is a bottom view of my attachment, the regular horseshoe being indicated by dotted lines; Fig. 3 is a vertical longitudinal section through the shoe, the section being on the dotted line 3—3 of Fig. 4 and the longitudinal bar of the overshoe or attachment being shown in full, and Fig. 4 is a rear elevation, partly broken away and partly in transverse section on the line of the bolt which secures the longitudinal and transverse members of the attachment in due relation to each other.

In the drawings, 10 designates the hoof of a horse or other animal and 11 a shoe of ordinary or suitable type secured thereto. Upon the shoe 11 and hoof 10 I apply the overshoe or attachment of my invention, which attachment comprises a longitudinal bar 12 having at its front and rear portions the calks 13 and at its front end an upwardly and inwardly inclined integral auxiliary bar 14, and a transverse member 15 comprising bars 16, 17, which below the hoof overlap each other, as shown in Fig. 4 and at their outer portions have downwardly projecting calks 18, 19 and upwardly and inwardly extending bar members 20, 21, respectively. The transverse bars 16, 17 are slotted, as at 22, and therein receive a bolt 23 which extends downwardly through a close fitting hole 24 in the longitudinal bar 12 and through the said slots 22 in the transverse bars 16, 17 and below the latter receives a nut 25 by which the longitudinal and transverse members of the overshoe become closely bound together. The lower end of the bolt 23 extends downwardly to the horizontal plane of the lower ends of the calks provided on the overshoe and is tapered to in itself constitute a calk or means for aiding in preventing the slipping of the horse. The bolt 23 above its pointed lower end is threaded to receive the nut 25, and above this nut the bolt is polygonal in cross-section and engages the sides of the slots 22 in the bars 16, 17 and the sides of the polygonal hole 24 in the bar 12, with the result that the said bars cannot have any pivotal or swiveling action on the bolt and the transverse bars are maintained rigidly in their right-angular relation to the longitudinal bar 12. One essential function of the bolt 23 and slots 22 is that it enables the lateral adjustment of the bars 16, 17 constituting the transverse member 15 of the overshoe, whereby the shoe becomes capable of being secured to hoofs varying in width.

The upwardly and inwardly inclined bars 14, 20, 21 to engage the front and sides of the hoof are preferably integral with the respective bars 12, 16, 17 and slotted, as at 27, to receive a strap or other suitable securing means 28. I preferably bind the overshoe on the hoof by means of a flexible strap 28 threaded through the slots 27, the strap at each slot having its advance end inserted reversely through the slot and brought around against the outer face of the bar so that at each bar the strap forms a loop transversely around that portion of the bar exterior to the slot, and in this way after the strap has been tightened around the hoof of a horse and buckled, it can by no possibility slip or creep around the hoof or lose its firm binding relation therewith.

The rear end of the longitudinal bar 12 will preferably be wider than the remaining portion of the bar, as shown in Fig. 2, and said bar at its front portion is offset downwardly, as at 30 (Fig. 3), to bring the upper surface of said portion on a level with the upper surface of the end portions of the bars 16, 17. The end portion of the bar 16 is offset upwardly, as at 31 (Fig. 4), in order that the upper surface of said portion may be on a level with the bar 17.

The overshoe or horseshoe attachment of my invention is composed of few parts, these mainly being three integral bars 12, 16, 17, which are adjusted and secured to each other by a single bolt 23 and bound to the hoof by the strap 28. The overshoe or attachment is thus rendered of simple and inexpensive construction and capable of ready application to and removal from the hoof of a horse or other draft animal.

What I claim as my invention and desire to secure by Letters Patent, is:

1. An attachment for horseshoes comprising a longitudinal bar having calks on its end portions and at its front end an auxiliary upwardly extending bar to engage the front of a hoof, and a transverse bar-member secured to said longitudinal bar and having at its ends downwardly projecting calks and upwardly extending auxiliary bar portions to engage the sides of the hoof, said auxiliary bar portions being slotted, combined with flexible means extending through said slots for binding the attachment to the hoof; substantially as set forth.

2. An attachment for horseshoes comprising a longitudinal bar having calks on its end portions and at its front end an auxiliary upwardly extending bar to engage the front of a hoof, and a transverse bar-member secured to said longitudinal bar and having at its ends downwardly projecting calks and upwardly extending auxiliary bar portions to engage the sides of the hoof, said auxiliary bar portions being slotted, combined with a strap extending through said slots for binding the attachment to the hoof, said strap at its advance end being threaded in reverse direction through the slots and brought around against the face of the auxiliary bars, whereby the strap becomes looped at each of said bars; substantially as set forth.

3. An attachment for horseshoes comprising a longitudinal bar having calks on its end portions and at its front end an auxiliary upwardly extending bar to engage the front of a hoof, a transverse member comprising overlapping slotted bars each having at its outer end a downwardly extending calk and an upwardly extending auxiliary bar portion to engage the side of the hoof, a bolt extending through said longitudinal bar and the slots in the overlapping portions of said transverse bars for enabling the lateral adjustment of said transverse bars and the securing of all said bars together, and binding means engaging said auxiliary bars for securing the attachment to the hoof; substantially as set forth.

4. An attachment for horseshoes comprising a longitudinal bar having calks on its end portions and at its front end an auxiliary upwardly extending bar to engage the front of a hoof, a transverse member comprising overlapping slotted bars each having at its outer end a downwardly extending calk and an upwardly extending auxiliary bar portion to engage the side of the hoof, a bolt extending through said longitudinal bar and the slots in the overlapping portions of said transverse bars for enabling the lateral adjustment of said transverse bars and the securing of all said bars together, and binding means engaging said auxiliary bars for securing the attachment to the hoof, said bolt where it engages said slots and the walls of the hole it passes through in the longitudinal bar being polygonal in cross-section to prevent swiveling action of the bars; substantially as set forth.

5. An attachment for horseshoes comprising a longitudinal bar having calks on its end portions and at its front end an auxiliary upwardly extending bar to engage the front of a hoof, a transverse member comprising overlapping slotted bars each having at its outer end a downwardly extending calk and an upwardly extending auxiliary bar portion to engage the side of the hoof, a bolt extending through said longitudinal bar and the slots in the overlapping portions of said transverse bars for enabling the lateral adjustment of said transverse bars and the securing of all said bars together, and binding means engaging said auxiliary bars for securing the attachment to the hoof, said bolt being extended downwardly to the lower horizontal plane of said calks and tapered to act as a calk; substantially as set forth.

6. An attachment for horseshoes comprising a longitudinal bar having calks on its end portions and at its front end an auxiliary upwardly extending bar to engage the front of a hoof, a transverse member comprising overlapping slotted bars each having at its outer end a downwardly extending calk and an upwardly extending auxiliary bar portion to engage the side of the hoof, a bolt extending through said longitudinal bar and the slots in the overlapping portions of said transverse bars for enabling the lateral adjustment of said transverse bars and the securing of all said bars together, and binding means engaging said auxiliary bars for securing the attachment to the hoof, the front portion of said longitudinal bar being offset downwardly and the lower one of said transverse bars being offset upwardly, whereby the outer upper surfaces of all said bars become on the same horizontal plane; substantially as set forth.

Signed at Pearl River, in the county of Rockland and State of New York, this 30th day of September A. D. 1910.

WILLIAM H. TRABUE.

Witnesses:
W. EGLING HALL,
JOHN A. FISHER.